Sept. 10, 1963 R. A. COVINGTON, JR., ETAL 3,103,170
TUBING FOR CARTRIDGE CASINGS AND THE LIKE
AND METHOD OF MAKING THE SAME
Filed June 21, 1960 2 Sheets-Sheet 1
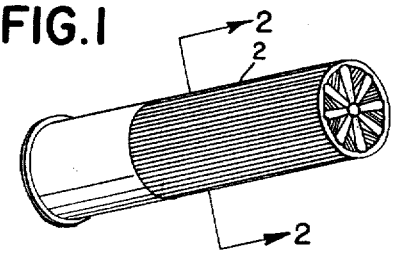
FIG.1
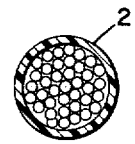
FIG.2
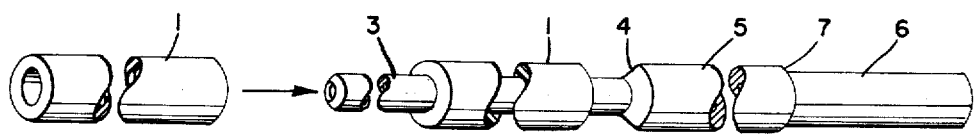
FIG.3a
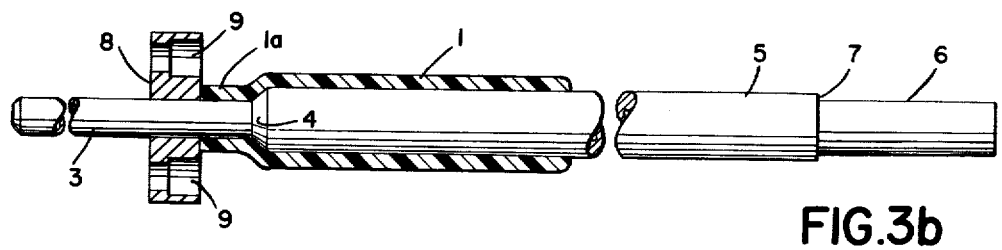
FIG.3b
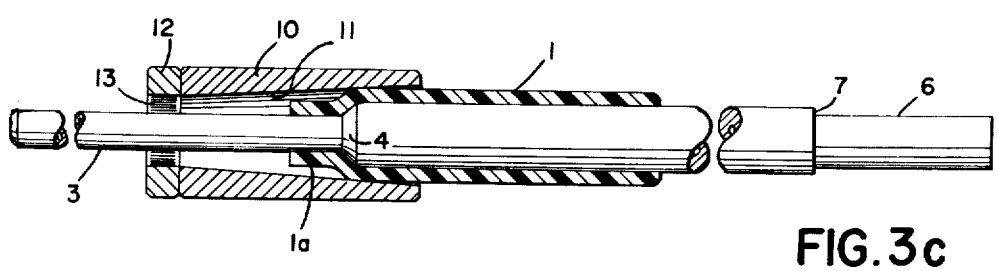
FIG.3c
FIG.3d
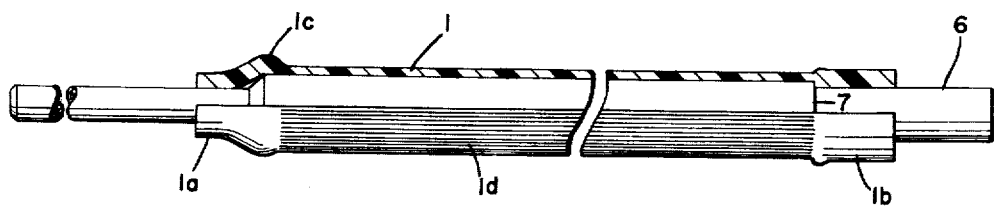

Sept. 10, 1963   R. A. COVINGTON, JR., ET AL   3,103,170
TUBING FOR CARTRIDGE CASINGS AND THE LIKE
AND METHOD OF MAKING THE SAME
Filed June 21, 1960                              2 Sheets-Sheet 2
FIG.4
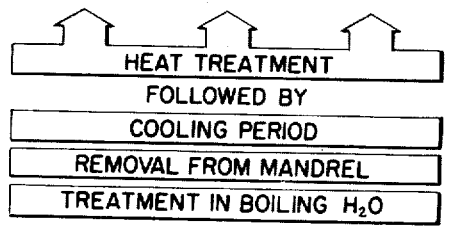
FIG.5
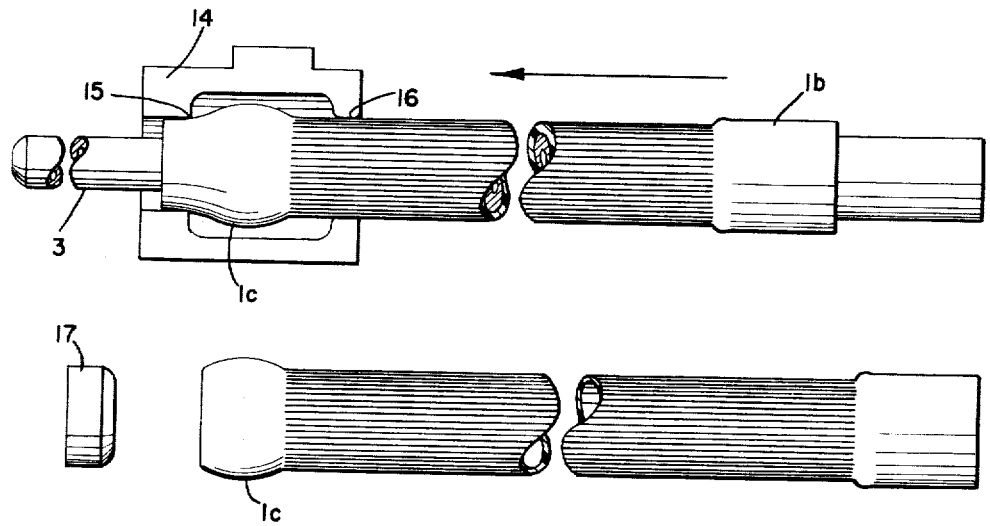
FIG.6
FIG.7
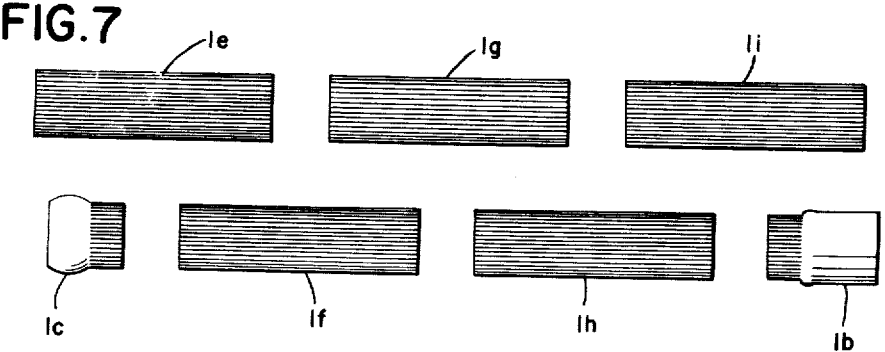

United States Patent Office 3,103,170
Patented Sept. 10, 1963

3,103,170
TUBING FOR CARTRIDGE CASINGS AND THE LIKE AND METHOD OF MAKING THE SAME
Robert A. Covington, Jr., Wilmington, Del., and Benjamin K. Daubenspeck, Stratford, Rex E. Dickey, Shelton, and Edward M. Yacko, Bridgeport, Conn., assignors to Remington Arms Company, Inc., Bridgeport, Conn., a corporation of Delaware
Filed June 21, 1960, Ser. No. 37,598
15 Claims. (Cl. 102—43)

This invention relates to seamless, tubular articles which are formed of synthetic olefinic polymers and which are subjected in use to forces of great magnitude at high temperatures, which forces tend to tear said articles apart, as a result of strains imparted thereto in both a longitudinal and a transverse, i.e. circumferential direction. A typical application of the invention is its use in connection with cartridges for firearms and more particularly in connection with casings for shotgun shells.

This application is a continuation-in-part of copending patent application Serial No. 702,657, filed December 13, 1957, now abandoned.

A primary purpose of the invention is to provide a tubular element of the character indicated which is capable of withstanding the forces tending to rupture the same, as a result of strains imparted thereto in a longitudinal direction, resulting in what is known as a "cut-off," or split the same lengthwise as a result of strains imparted thereto in a circumferential direction, and one which will resist stress cracking over long periods of storage under varying temperatures and climatic conditions. Another important purpose of the invention is to produce such a tubular element in an economical manner so as to render the same commercially competitive with presently available tubular elements formed of other materials. A still further purpose is to provide such tubular elements which have great dimensional stability under storage conditions at varying temperatures.

It will be appreciated that casings for shotgun shells are subjected to rigorous treatment in the course of firing a shotgun. They are subjected to great forces at quite high temperatures, the forces tending not only to stretch and tear or split the casings apart as a result of strains imparted thereto in a circumferential direction, but also to produce cut-offs by the forces exerting a longitudinal strain. High forces of this character are developed by the tendency of the explosion of the cartridge to drive the shot both radially into engagement with the inner surface of the casing and in a longitudinal direction as the shot is fired from the cartridge. It is therefore particularly important for shotgun shell casings that the latter have a high tensile strength in the longitudinal direction.

Conventional shot shell cartridges are provided with casings formed of a convolutely wound tube of heavy paper which is usually impregnated with a wax. A metal cap or head containing the primer element and the necessary wad structure is applied to one end of the casing and the latter is provided with the powder charge and shot together with one or more wads. There are many disadvantages to this type of cartridge casing which have been recognized for many years. In addition to requiring a complicated process for convolutely winding the paper tubes and coating and dimensionally sizing them, the finished casings occasionally fail upon being fired due to body cut-offs or body splits. Such occurrences sometimes expose the breech mechanism to a flow of burning gas under high pressure with consequent damage to the gun action and possible injury to the shooter. A body cut-off may result in the cut-off portion of the casing remaining jammed in the chamber, thus making difficult its removal or ejection and leading to a dangerous condition.

Paper shot shell casings are susceptible to scuffing and abrasion of their surfaces which accelerates moisture absorption and swelling, thus leading to either jamming of the gun or preventing loading altogether. Also, paper cartridge casings have a restricted capacity for reloading and reuse, a feature which has long been desired by the shooting public. In addition, the end closure of conventional paper cartridges has at times been difficult to maintain where continued storage in a gun magazine, subject to the recoil forces of firing, has resulted in the shot of the stored cartridge forcing open the closure or crimp due to the inertia forces developed.

These enumerated defects and disadvantages of the conventional paper cartridge cases have led those in the field to investigate the use of other materials in the place of paper. This search and investigation has been under way for well over thirty years with many proposals and suggested applications of new materials and processes, none of which have been successful, either operationally or economically. The prior art indicates many attempts to find suitable materials to replace paper but prior to the present invention no entirely suitable material has been found or used. The materials tried in the past have included plastic materials, one example of which is ethyl cellulose. However, to date each of these materials has exhibited serious defects and disadvantages which have precluded their adoption for production purposes. A very serious defect associated with these previously tried materials has been their deterioration and dimensional instability during periods of storage or during conditions of extreme temperatures.

In addition to this defect, it has been discovered as to certain plastics, such as ethyl cellulose, that the plasticizer component would bleed into the propellant powder of the cartridge which results in a low pressure round, an undesirable condition.

It has been discovered in the development of the present invention that the various problems involved in the production of a satisfactory shotgun shell casing can be overcome by the adoption of certain specific plastic materials for the purpose and the subjection of these materials to quite specific working, with resultant molecular orientation, in the production of the finished casing. The resulting casings have been found capable of withstanding a number of reloadings and firings without exhibiting the difficulties known as body cut-offs or body splits. Also, they have been found to resist the absorption of water with attendant swelling and they possess great dimensional stability under varying temperature and other climatic storage conditions. These characteristics are obviously of great importance in connection with a cartridge. Moreover, the improved cartridge casing is of simple construction and may be readily and economically manufactured.

In accordance with the invention, it has been found possible to produce cartridge casings having the desired characteristics by forming them of substantially linear or high density polyethylene which may or may not have been prepared with the addition of a small precentage of one or more other olefins, such as alpha olefins having 3 or more carbon atoms. In all cases it has been found desirable to employ a polymer which is very largely composed of ethylene ($-CH_2-CH_2$) linkages. Thus, when another olefin has been added, the ethylene portion should constitute at least 90 weight percent of the structure and the other olefin or olefins entering into the structure should not exceed 10 weight percent and in most instances should be considerably less than this. In general, it has been found that where the other olefin or olefins employed have in the range of 3 to 10 carbon atoms, such as propylene to decene, they should be present in a relatively small percentage, not over about 5% and preferably considerably less, whereas when olefins having a greater number of carbon atoms are added to the ethylene, such olefins may constitute a somewhat greater percentage of the polymer, but not exceeding 10%.

It has been found in the case of polymers made from ethylene alone that the polymeric molecules should preferably be substantially linear, having an infrequent occurrence of short side branches, i.e., preferably less than 1 for each 200 carbon atoms, although satisfactory results are obtainable for the purposes of the invention with polyethylene having somewhat greater frequency of side branching and with some relatively long branches. Whether the polymer is made with ethylene alone or from a mixture of olefins as mentioned above, its annealed density in grams per cc. at 20° C. should be at least 0.94. When the polymer is to be used for shot shell casings it should have a melt index of not over 1.0, but if the tubular member is to be used for other purposes the polymer of which it is formed may have a somewhat higher melt index. For whatever purpose the tubing is to be used the polymer should have a high degree of crystallinity, i.e., between 60% and 85%, as determined by the method to be explained. Its crystalline melting point should be at least 125° C., as determined in the manner to be explained, and the weight average molecular weight, as measured by light scattering in alpha-chloronaphthalene at 125° C., should preferably be at least 125,000.

The desired weight average molecular weight (Mw.) varies with the melt index (MI) of the polymer. Thus, for polyethylenes having negligible long chain branching and infrequent occurrence of short side branches, it has been found that a straight line relationship exists between Mw. and MI as plotted on a double logarithmic graph. Where MI is .01, Mw. should be about 425,000. For such polyethylenes having an MI of 1.0, the Mw. should be about 125,000. It has been found that for other suitable polyethylenes, having greater frequency of side branches and a greater extent of long chain branching, the Mw. of desirable polymers is considerably higher, but as plotted against MI on a double logarithmic graph it should fall along or below a straight line having Mw. values about 50% higher than the first mentioned polyethylenes for any MI. Thus, for suitable polyethylenes having an MI of .3, it has been found that the Mw. should be between 170,000 and 255,000, while for polyethylenes having an MI of .5, it has been found that the Mw. should be between 140,000 and 210,000. For some purposes, other than cartridge casings, polyethylenes having a somewhat higher MI than 1.0 may be employed. Depending upon the extent of long chain branching, these polymers should have Mw. values falling between the two straight lines mentioned above in relation to the MI values.

The light scattering method for determining the weight average molecular weight, referred to above, is fully disclosed in an article written by J. T. Atkins, L. P. Muus, C. W. Smith, and E. T. Piesky, in the "Journal of the American Chemical Society," 79, 5079; 1957.

The percentages of crystallinity of the preferred polymers, as above set forth, are on the basis of determinations made in accordance with the technique explained in a paper entitled "Crystallinity of Polyethylene by X-Ray Diffractometry" by R. H. H. Pierce, Jr., J. Holmes, F. C. Wilson and W. M. D. Bryant, presented at the 132nd National Meeting of the American Chemical Society, New York, September 8–13, 1957. That paper includes certain refinements over the method described in a paper by Bryant, Tordella and Pierce presented at the 118th National Meeting of the American Chemical Society at Chicago, Illinois, September 3–8, 1950. Copies of both papers have been quite widely distributed, and are now available at the Wilmington Institute Free Library in Wilmington, Delaware. Briefly, the method of determination involves the use of a "Norelco" Geiger counter X-ray diffractometer equipped with a scintillation counter and an Atomic Instrument Company pulse height discriminator. This instrument records the diffracted radiation as a linear function of the Bragg angle. The percentage crystallinity (or conversely, the amorphous percentage) is obtained by measurement of the relative areas under the "amorphous" and under the (110) and (200) crystalline diffraction peaks, after application of appropriate corrections. The measurement of percent crystallinity by this method involves the following features:

(1) Virtual elimination of the effects of "white radiation," thus leading to substantial reduction of the background correction.

(2) Displacement of the angular position of the amorphous and the two major crystalline peaks as a result of chain branching.

(3) Establishment of the constancy of crystalline peak areas over a broad range of "crystallite size."

(4) Demonstration of the existence of a standard peak shape, widely applicable to both crystalline and non-crystalline diffraction peaks.

(5) Reexamination of the basic X-ray corrections appropriate to crystallinity measurement.

In making the determinations, samples in the form of sandwiches of thin films or 20 mil molded bars are used and scans are made by reflection. The primary copper radiation is mono-chromated by passage through nickel filters. The pattern produced by the intensity of the amorphous and the 110 and 200 crystalline peaks is divided into areas $a$, $b$, and $c$, where $a$ corresponds to one-half of the area of the amorphous band, $b$ is equivalent to the fraction of the amorphous band underlying area $c$, and the difference, $c-b$, represents one-half of the 200 area. The total pattern area is taken as $d$ and the 110 area is obtained by subtracting the sum of the amorphous and 200 areas from the total pattern area $d$. These areas may be measured by the use of a planimeter. The amorphous content of the specimen being analyzed is determined from the formula:

$$A(\%) = 100 \frac{F_A(2a)}{(F_A)(2a) + 1.00[d - 2a - 2(c-b)] + F_{200}[2(c-b)[}$$

In this formula, $F_A$ is the amorphous intensity correction factor and $F_{200}$ is the intensity correction factor for the 200 crystalline diffraction peaks. The letters $a$, $b$, $c$ and $d$ have the connotations indicated above.

It has been found from numerous analyses of specimens of polymers of the character contemplated by the present invention that crystallinity is very definitely related to density or its reciprocal, specific volume. Accordingly, a quite reliable indication of percent crystallinity of any particular specimen may be obtained by determining its density or specific volume. The following table indicates the relationship that has been found to exist between annealed density and crystallinity of ethylene polymers when annealed.

| Density (20° C.) | Crystallinity (percent) |
|---|---|
| 0.94 | 63 |
| 0.95 | 70 |
| 0.96 | 77 |
| 0.97 | 84 |

The crystalline melting point referred to above is determined under a polarizing microscope using the Kofler micro-heating stage provided with controlled means for heating films of polymer of about 100–300 microns in thickness prepared by pressing out a small sample of polymer between cover glasses on a hot plate. The microheating stage employed in this determination was described by L. Kofler and A. Kofler in "Micro-Methoden zur Kennzeichnung Organischer Stoffe und Stoffgemische," Univ. Wagner, Innsbruck, 1948. In determining the melting point the films under test are heated slowly (e.g. 0.1° C./min.) through the melting region and the temperature at which there is disappearance of double refraction is recorded.

The term "annealed density," as used herein, refers to the density of the polyethylene resin when it has been molded in a press at a temperature at least 30° C. above its melting point and then annealed, either by slow cooling in the press or by subsequent heating in the melting region (130–140° C.) for an hour or several hours in an oven, between glass or metal sheets to protect from oxidation and then turning off the oven and allowing slow cooling in the oven, for at least one hour to a temperature of 60° C.

It has been found that, for the purposes of the present invention, if a high density polyethylene is employed it may have an annealed density between 0.94 and 0.97 and is preferably in the range of 0.95 to 0.96. When the polymer employed is formed from ethylene with small percentages of 1-olefin co-monomers, such as 1-butene, 1-hexene, 1-decene, etc. these should preferably have an annealed density between 0.94 and 0.95 but may, in some instances, have a higher annealed density.

Correlated with high molecular weight and high annealed density is a high stiffness factor which is particularly desirable for the primary purpose of the invention. Thus, a tube having a wall thickness of only about .02 inch, made in accordance with the invention will be found to have sufficient stiffness and resilience to maintain its original form during subsequent relatively rough handling. A casing produced in accordance with the present invention will also be found to be highly resistant to stress cracking. This is highly important in connection with cartridge casings and also other uses to which the improved tubing may be applied.

"Melt index" as herein used is determined by the method identified as ASTM–D1238–52T, which is described in the "1955 Book of ASTM Standards Including Tentatives," published by the American Society for Testing Materials at Philadelphia, Pa. The melt index determination referred to herein is that designated "Procedure A" described on pages 292–295 of said book. In some instances the material suitable for the purpose of the present invention will have a zero melt index since it will be found that there will be no measurable flow rate in ten minutes under the specified test conditions.

In accordance with the present invention a thick-walled tube will be extruded from a mass of the molten polymer. By "thick-walled," as herein used, is meant a tube which is quite rigid and stiff and resistant to deformation upon application of a substantial squeezing force. Its thickness may vary with the intended use of the final tube formed therefrom, but it will be substantially greater than that of what is conventionally classified as a flexible film. The thick-walled tube of the present invention will ordinarily be greater than 0.1 inch. The extruded tube for 12 gauge cartridge casing purposes preferably has a wall thickness of about 0.130 inch. This tube is then subjected to cold working by deformation in both a circumferential and a longitudinal direction. Such working may be effected at any temperature above room temperature but below the crystalline melting point of the material as a whole. It may thus be carried out at any temperature up to about 250° F. or even somewhat higher. From the standpoint of practical operating conditions, however, there are advantages to be gained by carrying out the working at lower temperatures, such as normal room temperature. In the production of a shotgun shell casing it is desirable to subject the original tubing to expansion in a circumferential direction to an extent sufficient to increase its inside diameter about 40%. For the same purpose the longitudinal deformation of the material should preferably be in the neighborhood of 350% increase in length. In the course of such working the wall thickness of the finished tubing will be reduced to a final dimension of about .02 inch. Also the working appears to somewhat decrease the crystallinity of the polymer.

It will be understood that the bi-axial deformation or working of the initial tubing brings about bi-axial molecular orientation, the extent of which in each direction is commensurate with the amount of deformation in each direction. As a further step in the production of the improved tube, it is given a heat setting treatment, while under restraint against shrinkage, which apparently partially relaxes the stresses or internal forces set up during the molecular orientation and increases crystallinity to assist in locking in the orientation, so that the tube becomes dimensionally stable at all temperatures to which it will be normally subjected. However, upon heating the tube to, or slightly above, its crystalline melting point, without restraint against shrinkage, it has a tendency to return to its initial dimensions. This provides a convenient way of determining the extent of working that has been imparted in each direction to the initial tubing in converting it to the form suitable for the intended purpose. Thus, a section of the finished tubing may be suspended in a glycerin bath the temperature of which is elevated to a point above the crystalline melting point of the tubing, i.e., to a temptrature of about 280° F. By maintaining it at that temperature until no further dimensional change occurs in the section of tubing being tested, it will be found that the tubing is restored to substantially its original extruded dimension as to inside diameter, outside diameter and length. The change so noted from the dimensions of the tube section being tested provides reliable information as to the extent of working and hence of molecular orientation to which it has been subjected. Thus, in a typical test, a section of final tubing having an O.D. of .785 inch and an I.D. of .740 inch was found, upon the glycerin heat treatment, to assume the values .765 inch O.D. and .445 inch I.D. From these determinations it is possible to compute the longitudinal working or orientation ($R_L$) and the circumferential working or orientation ($R_C$). $R_L$, as used herein, means the ratio of the cross-sectional area of the wall of the relaxed heat treated tube section divided by the initial cross-sectional area of the wall of the tube being tested. From the various diameters mentioned, this will be found to be 5.65. It will be understood that transverse or radial deformation of the tube does not decrease its cross-sectional area. Only the longitudinal deformation serves to reduce the cross-sectional area. Therefore, the ratio indicated gives a good measure of the longitudinal deformation or orientation. $R_C$, as used herein, means the ratio of the mean diameter or circumference of the tube under test to the mean diameter or circumference of the relaxed heat treated body. This will be found to be 1.26 from the values given above.

With the foregoing objects and purposes in view, the means and method employed in applying the invention to the production of shotgun cartridges will now be more fully described in connection with the accompanying drawings wherein:

FIG. 1 is a perspective view of a shotgun cartridge having a casing embodying the features of the invention;

FIG. 2 is a cross-sectional view through the cartridge taken along the line 2—2 of FIG. 1;

FIG. 3a is a perspective view of a mandrel employed in connection with the invention and shows a section of an extruded tube about to be applied and as applied to a reduced portion of the mandrel;

FIG. 3b is an elevational view illustrating the first step in forcing the section of tubing along the mandrel and thereby stretching the major portion of it circumferentially;

FIG. 3c is a view showing a draw die positioned in relation to the mandrel carrying the tubing in the position thereon shown in FIG. 3b, said draw die being utilized in stretching the tubing longitudinally of the mandrel;

FIG. 3d is a view of the mandrel with the section of tubing fully stretched along the same upon completion of the step shown in FIG. 3c, a portion of the tubing being broken away to show more clearly its relation to the mandrel;

FIG. 4 is a diagram or chart showing the successive treatments imparted to the tubing following its application to the mandrel in the position illustrated in FIG. 3d;

FIG. 5 is an elevational view showing a portion of a stripper die in relation to the mandrel and section of tubing in the course of removal of the tubing from the mandrel;

FIG. 6 is an elevational view showing the stripped tubing, and at the left end a small section of the tubing which is severed from the main body of the original tubing in the course of stripping the tubing from the mandrel; and FIG. 7 is a view showing the stripped tubing cut into sections of the desired length for cartridge casing purposes and showing the scrap portions cut from the two ends of the tubing. It will be understood that the various sections of the severed tubing are disposed along the same horizontal axis in the course of cutting the tubing into the desired casing lengths.

In the drawings the wall thickness of the tubing in relation to its diameter has been shown somewhat exaggerated for purposes of clearer illustration. This is particularly true with respect to the main central portion of the tubing as shown in FIG. 3d which, as will be more fully explained, preferably has a wall thickness of about .02 inch.

It will be appreciated from the foregoing discussion of the nature and purposes of the invention that it is applicable to a variety of different forms of seamless, tubular members having special requirements as to longitudinal and transverse, i.e. circumferential, tensile strength, dimensional stability, resistance to stress cracking and the like. However, the nature and purposes of the invention are made more readily apparent from a discussion of its special applicability to the production of shot shell casings, which present special and peculiar problems that are very effectively solved by the invention. Therefore, the following detailed discussion of the invention will be directed primarily to that application of it.

As stated above, the objects of the invention are achieved by the selection of a starting material having quite specific characteristics and its treatment to produce tubular elements having the special characteristics essential to their intended use. For certain purposes the novel method of biaxially orienting tubular elements may be advantageously applied to tubing formed of certain thermoplastic, synthetic materials other than those specifically referred to herein.

The improved cartridge casing, to which the invention has been primarily directed, is indicated at 2 in FIG. 1. This casing, which replaces the conventional paper casings of prior commercial cartridges, is formed very largely of ethylene polymerized, with or without the addition of small percentages of other olefins, under conditions adapted to form substantially linear or high density polyethylene. The polyethylene so employed may, if desired, contain a small percentage of one or more olefins having more than 2 carbon atoms. Typical of such olefins which may be added to the polymer employed are propylene, butylene, 1-hexene, heptene, 1-decene and alpha-tetradecene. The olefins entering into the polymer are open chain, unsaturated hydrocarbons having one terminal double bond.

A polymer of the foregoing character is first extruded in a conventional manner to form a thick-walled tube of appropriate outside and inside diameter, which after extrusion is subjected to molecular orientation by cold working in both the longitudinal direction and circumferential direction. Following such cold working the tube is heat-set under appropriate conditions, while held against contraction or shrinkage, to impart to the finished tubular member the necessary qualities of tensile strength, in both the longitudinal and circumferential directions, and dimensional stability which are required for its use as a shot shell casing. Preferably also, the tubing after the foregoing treatment, and release from the restraint against shrinkage, is subjected to a treatment in a bath of water at substantially a boiling temperature. This brings about a slight shrinkage but serves to further stabilize the tubing against shrinkage in storage.

The invention is based on the discovery that greatly improved cartridge casings may be made from polymers of the character indicated above which have been specially treated, in the manner explained, after conventional extrusion of the molten polymer. High density, substantially linear polyethylene is a product commercially available at the present time in a wide variety of weight average molecular weights, annealed densities, and crystalline content. The indicated polyethylene polymers containing small percentages of other olefins are also available and may be readily produced with a wide variety of characteristics. For the primary purpose of the present invention it is important that the polymer employed have quite definite characteristics of the type mentioned. They are obtained from controlled polymerization of ethylene, with or without other olefins, and are characterized by high density, stiffness, special weight average molecular weights and high degree of crystallinity, all as hereinabove defined.

In the illustrated embodiment of the invention the selected polymer is extruded in a conventional manner to form a continuous, heavy walled tubing which is subsequently cut into lengths for further processing. This processing, as explained, involves cold working both longitudinally and circumferentially of the axis of the tubing. In the following discussion the term "$R_L$" has the meaning stated in the foregoing and is the ratio of the original cross-sectional area to the final cross-sectional area of the tubing. This, as has been explained, corresponds with the ratio of the final length to the original length before cold working. The term "$R_C$" means the ratio of the average of the inside and outside diameters after cold working to the average of the inside and outside diameters before cold working. Thus, if a length of heavy walled tubing is cold worked in a circumferential direction to increase its average of inside and outside diameters to the extent of 40%, the value of $R_C$ will be 1.40. If the length of the tube section is increased to 450% of its original length, the value of $R_L$ will be 4.50.

An example of the basic equipment which may be used and of the steps which may be followed in practicing the invention is indicated schematically in the drawings. A primary element or tool forming part of this equipment is a mandrel in the form of an elongated hollow rod or bar made of steel or other suitable material. The mandrel shown in the drawings is provided with a circular cross-section throughout and has a forward portion 3 of relatively small diameter, which merges into an outwardly tapering portion 4 of increasing radius. To facilitate circumferential stretching of the tubing the mean angle of the tapering portion 4 to the main axis of the mandrel is preferably less than 45°. The tapering portion 4 merges into a third portion 5 of constant radius. Near the rearward end of the mandrel a sharp transverse shoulder 7 is provided and beyond this is a section 6 of slightly reduced circular cross-section.

As shown in FIG. 3a, a section 1 of extruded tubing formed of the desired material is applied over the reduced end 3 of the mandrel in any suitable way. The tubing section 1 is thick-walled and quite rigid. Its internal diameter is only slightly larger than the outside diameter of the portion 3 of the mandrel. After the tubing section has thus been applied to the mandrel, the latter is brought into cooperation with a die 8 having a central opening only slightly larger than the outside diameter of the portion 3 of the mandrel. Relative movement between the mandrel and the die 8 serves to force the section of tubing into the position on the mandrel indicated in FIG. 3b. Preferably for this purpose the die 8 is held fixedly by a suitable frame structure by means of screws cooperating with openings 9 in the die member and the mandrel is driven into the die member by any suitable means. The relative movement between the die and the mandrel is provided by driving the mandrel forcibly toward the left (FIG. 3b) thus causing the inner end of the tubing to ride upwardly along the shoulder 4 of the mandrel and then along the portion 5 of the latter until only a relatively short section 1a of the tubing remains on the portion 3 of the mandrel. The mandrel, with the tubing thereon, is then withdrawn from the die 8 for transfer to the next operation.

With the section of tubing so applied to the mandrel, the latter is brought into cooperation with a draw die 10 (FIG. 3c). This draw die has a tapered inner surface having a diameter adjacent its right end (FIG. 3c) slightly larger than the outside diameter of the main portion of the tubing 1. At its left end the tapered surface 11 is of a diameter equal to, or slightly less than, the outside diameter of the desired final tubing. Abutting the left end of the draw die 10 is an annular die element 12 which may suitably have a ribbed inner surface, as indicated at 13 (FIG. 3c). The root diameter of the ribbed opening in the die element 12 is that of the desired maximum outside diameter of the ribbed finished tubing before heat treatment. This may be slightly larger than the minimum diameter of the draw die 10. The mandrel carrying the tubing 1 in the form shown in FIG. 3c is moved relative to the die elements 10 and 12 and for this purpose the latter are preferably held fixed in a suitable frame structure while the mandrel is forcibly advanced through the die openings and completely discharged from the left end thereof. In the course of such relative movement the tubing is stretched longitudinally into the position indicated in FIG. 3d. Only that portion of the tubing which is to the right of the tapering surface 4 on the mandrel is stretched in this manner and it is so stretched that the end of the tubing is forced over the shoulder 7 of the mandrel and inwardly against the portion 6 of somewhat reduced diameter. In the course of thus stretching the tubing the ribbed or serrated inner surface 13 of die 12 imparts the ribbing effect indicated at 1d in FIG. 3d.

When the tubing has been stretched on the mandrel into the position shown in FIG. 3d, it will be restrained against shrinkage in any direction. The body of the mandrel will, of course, prevent circumferential shrinkage and the cooperation of the portions 1a and 1c of the tubing with the outwardly flaring portion 4 of the mandrel prevents any contraction at this end toward the right while the cooperation of the portion 1b of the tubing with the shoulder 7 prevents any contraction of the tubing toward the left. It will be noted that sections 1a, 1c and 1b of the tubing are of greater thickness, and in part of greater diameter, than the usable portion 1d of the tubing. This is due to the fact that the ends of the section of tubing are not restrained against shrinkage or contraction and therefore tend to resume their initial wall thickness and length after the tubing and the mandrel have been passed through the die elements 10 and 12.

Following the foregoing treatment of the initial tubing, it is subjected to the successive steps indicated in FIG. 4. The first step is to heat the tubing, while held restrained against shrinkage by the mandrel, to a temperature of about 250° F., or slightly higher but below the crystalline melting point of the polymer. The tube is preferably held at such a temperature for about four minutes and is then cooled to room temperature while it is still restrained against shrinkage. Such heating may either be dry in a suitable oven or by immersion in a suitable heated liquid medium such as glycerin. In this way the tubing is "heat-set" and is rendered substantially dimensionally stable. The extent of heating required to raise the temperature of the tube to that desired for the heat-setting treatment will, of course, vary according to the temperature at which the cold working of the tube has been performed. As explained above, this may be at room temperature or it may be at higher temperatures up to a point somewhat below the crystalline melting point of the polymer being used. It may not be necessary to add any heat for the heat-setting step, if the tube at the conclusion of the cold working step is still at a temperature of about 250° F. It is then simply necessary to permit it to cool to about room temperature while held against shrinkage in both the circumferential and longitudinal directions.

Upon the completion of the cooling step, the tube is removed from the mandrel. Such removal may be accomplished in any suitable way. One way is indicated in FIG. 5 in which the mandrel carrying the tube is introduced into a stripping device, one section of which is indicated at 14. This stripping device is preferably of such construction that two complementary sections of the type shown at 14 are caused to grip the left end portion of the tube. When the stripping device is closed around the tube it presents a relatively sharp edge 15 of circular form having a diameter slightly larger than the outside diameter of portion 5 of the mandrel. Another cylindrical surface 16 on the stripping device surrounds and grips the main portion of the stretched tubing inwardly of the bump 1c. With the parts in this position a sharp blow is applied to the right end of the mandrel. This causes the edge 15 to shear off the outer end of the tubing to form a scrap section 17 (FIG. 6), due to the coaction between the edge 15 and the portion of the surface 4 on the mandrel which merges into the main body 5 of the mandrel. The force applied to the mandrel at this time is sufficient to drive it completely through the stripper 14, thus leaving the major part of the tubing retained by the stripper. The latter is subsequently opened out to release the tubing which is then in the form shown in FIG. 6. Scrap section 17 remains on the reduced portion 3 of the mandrel and may either be removed or permitted to remain and be positioned in advance of a new section 1 of the initial tubing that is applied to the mandrel in the manner shown in FIG. 3a. If this latter procedure is followed, the scrap section will be forced back by the new section of tubing onto the portion 6 of the mandrel when that new section is drawn. As the mandrel and tube are forced through the die 10 in the drawing operation, the scrap section will almost invariably be stripped off the mandrel and may be retained in the entrance to the die 10 from which it may be removed by any convenient method.

Any suitable form of cutter may be employed to sever the main body of the stretched and treated tubing into the sections 1e, 1f, 1g, 1h and 1i indicated in FIG. 7. In so doing the bulbous ends 1c and 1b will be cut off and become scrap. Each of the sections 1e–1i will, of course, be cut to the desired length for a cartridge casing which may be assembled in a conventional way with the base member of a cartridge.

Between the removal step and the cutting step described above, it has been found desirable to subject the tubing shown in FIG. 6 to treatment in water at a temperature near the boiling point. This treatment, for a period of say, ten minutes, has been found to increase the dimensional stability of the tubing in both its longitudinal and radial or circumferential directions and thus insures, to an even greater extent than the above-described heat-setting treatment alone, that a cartridge having a section of the tubing as its casing will give proper performance even after long periods of storage. However, tubing which has not been subjected to the hot water treatment has been found to be quite satisfactory for cartridge casing purposes. Its dimensional stability is very good.

After the casing has been assembled in a shotgun cartridge and the latter has been filled with powder, shot and wad components, the outer end of the casing may be closed by a conventional crimping process. It has been found that the new and improved cartridge casing formed in accordance with the invention is such that there is a greatly reduced tendency for the crimped closure to return to its original open configuration than has been the case with prior constructions. The small, central opening remaining after the outer end of the casing is crimped and folded inwardly may be sealed by a hot punch to further improve the moisture resistant characteristics of the cartridge.

It is not fully understood why the cold working of the particular material employed in accordance with the invention, followed by the heat-setting and stabilizing treatments, results in an article of such greatly increased strength, dimensional stability and resistance to stress cracking under varying temperature conditions as to render it highly satisfactory for use as a cartridge casing. It is known that the various steps involved in the production of the final tubular member bring about changes, not all of which changes can be fully identified, having some relationship to the molecular orientation, distortion and rearrangement of the molecular groups of the polymer employed, all of which contribute to the suitability of the end product for cartridge casing purposes and the like.

As has been mentioned above, it has been found that the special polyethylene of which the casing is formed should preferably have a melt index (as defined above) of less than 1.0 and should have an annealed density above 0.94. Best results are obtained if the polyethylene so employed has a melt index of less than 0.7 and has an annealed density between 0.940 and 0.970. While the "heat-setting" treatment is preferably performed at a temperature of about 250° F., with the tube being maintained at that temperature for about three minutes, it may be carried out at temperatures from 200° F. to 260° F. for a period of from one to twenty minutes. The higher the temperature employed the shorter may be the duration of the heat-setting step.

As a typical example, high density polyethylene having an initial tensile strength of about 4,000 p.s.i. has been found to have its tensile strength greatly increased, both in a longitudinal and a circumferential direction, as a result of the cold working and heat-setting treatments described above. Thus, a tube formed of such material which has been subjected to circumferential working to the extent that $R_C=1.4$ and to longitudinal working to the extent that $R_L=4.5$ has been found to attain a tensile strength in the circumferential direction of 5,000 p.s.i. and in the longitudinal direction of 22,000 p.s.i.

In the employment of the invention in connection with shot shell casings the amount of cold working to be done in the longitudinal and circumferential directions appears to be determined by three considerations. Cold working in the longitudinal direction ($R_L$) should be as high as possible and apparently not less than about 3.5 to attain the desired longitudinal tensile strength and to eliminate cut-offs in the firing of the cartridges. Cold working in the circumferential direction ($R_C$) should apparently be at least 1.2 and preferably about 1.5, in order to minimize the occurrence of body splits. The third factor to be considered in selecting optimum values for $R_L$ and $R_C$ is the wall thickness of the original, extruded tubing. This wall thickness should be held to a minimum consistent with satisfactory production performance because of the greater ease with which the tubing may then be extruded at a commercially practicable rate. The relations between outside and inside diameters, which determine wall thickness, for the extruded tubing, and $R_L$ and $R_C$ can be readily determined by simple calculations. Allowable and preferred values for the blank dimensions are as follows (based on final tube dimensions of 0.780 inch O.D. and 0.740 inch I.D. and a desired extrusion rate which would be economically feasible):

|  | Max. Practicable Range, inches | Preferred Range, inches |
| --- | --- | --- |
| Outside Diameter (b) | 0.620–0.710 | 0.650–0.690 |
| Inside Diameter (a) | 0.360–0.460 | 0.390–0.430 |
| Wall Thickness (t) | 0.110–0.150 | 0.120–0.140 |

The great increase in tensile properties is presumably brought about by molecular orientation. It appears that the properties may be improved by molecular orientation in one direction and that this improvement is not destroyed by further working in a direction at 90° to the original work direction.

The improvement in tensile properties appears to be markedly influenced by the degree of working as indicated in the table below, for one example of this material.

| Cross-Sectional Area, sq. in. | | Longitudinal Degree of Work [1] $R_L$ | Longitudinal Tensile Strength,[2] p.s.i. |
| --- | --- | --- | --- |
| Original | Final | | |
| 0.060 | 0.060 | 1 | 3,000 |
| 0.120 | 0.060 | 2 | 4,850 |
| 0.177 | 0.060 | 3 | 8,100 |
| 0.246 | 0.060 | 4 | 11,700 |
| 0.300 | 0.060 | 5 | 17,900 |

[1] $\frac{\text{Original cross-sectional area}}{\text{Final cross-sectional area}}$ = Degree of work $R_L$.

[2] Heat set in non-circulating air which is at 300° F., for 10 minutes.

It is important that the amount of cold working in each direction be limited within specified ranges as, if too much working is done circumferentially, for example, not enough plastic material remains to be worked in the longitudinal direction without unduly reducing the wall thickness of the final tube, and sufficient tensile strength cannot be obtained to eliminate the defect known as mouth cutoffs. Conversely, if not sufficient circumferential work is put into the body the defect known as splits will occur upon firing. Suitable values for longitudinal and circumferential work are—

|  | Maximum Practicable Range | Preferred Range |
| --- | --- | --- |
| $R_C$ | 1.1–2.0 | 1.2–1.6 |
| $R_L$ | 2.5–6.0 | 3.5–5.0 |

A specific example of a procedure which may be followed in accordance with the invention is as follows:

Tubing, extruded from a molten mass of substantially linear polyethylene, having an outside diameter of 0.685" and inside diameter of 0.395", is cut to a length of 1.5" and worked circumferentially at room temperature by gradually expanding it on a mandrel until the I.D. is 0.742". One end of the tubing is then held by a suitable securing means and the tubing is worked at room temperature longitudinally by drawing it, with one end firmly secured, through one or more draw dies until the O.D. is reduced to approximately 0.780" and about .66" of the length, which is not included in the clamped portion having a length of about .84", has been increased to approximately 3". The tubing, still on the mandrel and now held at both ends to prevent shrinking, is then immersed in boiling water for five minutes. After the water immersion and subsequent cooling to about room temperature, the tubing may be stripped from the mandrel and the unworked portions cut off and discarded. The resultant tubing is now suitable for a 12 gauge shot shell casing. Obviously, however, the example above which relates to the production of single body lengths of shot shell tubing would result in an undesirably large ratio of scrap rings to finished product and it is therefore desirable to effect the operations on the tubing in multiple body lengths.

A preferred practice of the invention is as follows:

High density polyethylene, formed by polymerization of ethylene with or without small percentages of copolymerized other olefins and having a melt index of 0.4, is extruded in the form of tubing with an I.D. of 0.395" and an O.D. of 0.685". The extrusion temperature approximates 475° F. The tubing is water quenched immediately after leaving the extrusion orifice, and when at substantially room temperature is cut to a length of 4.5".

The thick-walled section of tubing is pushed upon the forward end of a mandrel, having an outwardly flaring, substantially conical shoulder adjacent one end, until only approximately ½" of its length is left unexpanded radially by said shoulder. This unexpanded residue serves as a securing means as the tubing then is worked longitudinally by drawing through a die. The mandrel serves as the punch during this operation. There is a shoulder 7 on the mandrel 16" back from the forward end of the major diameter of the mandrel. As the tubing is worked along the mandrel, some of the plastic material is worked over the shoulder 7 and contracts and thus serves as a securing means for the far end of the tube.

The tubing, still on the mandrel and being held or secured at both ends, by the conical shoulder 4 at one end and the shoulder 7 at the other end, is now heat-set by immersing in a glycerin bath at 250° F. for four minutes. Then the tubing is water cooled, and after the tubing is cooled to about room temperature it may be stripped from the mandrel and cut by conventional means into suitable lengths for shot shell bodies, leaving residual end portions which may be reground and recycled in the process, as explained above. The tubing, prior to cutting, may be further treated in substantially boiling water to further stabilize it dimensionally.

Although the examples given show the cold work imparted to the plastic by a cold drawing operation, other methods of working may be used with favorable results. Examples of other methods of working are rolling, forward extrusion and backward extrusion, and rotary swinging. Other methods of cold working thick-walled tubes, at temperatures below the crystalline melting point of the plastic employed, will occur to those skilled in the art. However, the cold working method herein specifically disclosed has been found exceptionally well suited for the purposes of the invention.

The heat setting operation may, as has been pointed out above, be effected in heated liquid media such as water or glycerin or in a suitable oven. It has been found convenient to heat set for a period of 10 minutes in non-circulating air maintained at a temperature of 300° F. or the heat setting may be carried out in circulating air at a somewhat lower temperature. The significant factors are that the cold worked tubing on the mandrel must be brought up to temperature, preferably in the neighborhood of 250° F. and less than 268° F., and maintained at that temperature for several minutes, to permit the heat setting effect to be obtained.

The cold worked and heat set substantially linear polyethylene, or co-polymer of the character described, has the further advantage of being of such a nature that it can be given a permanent set. This enables the production of a crimp closure of pleasing appearance and which has shown substantially no tendency for relaxation after storage at 150° F. for periods of several months. Moreover, the cold worked and heat-set cartridge casings of this invention exhibit a dimensional stability such that less than 2% shrinkage results from an immersion in boiling water (212° F.) for fifteen minutes, and this shrinkage is further reduced if the tubing, prior to formation of the end product, is subjected to the previously mentioned treatment in substantially boiling water. Substantially permanent dimensional stability has been found to exist at temperatures up to 150° F., even without the mentioned treatment. In contrast, tubing which has not been heat-set in accordance with the invention will shrink to the extent of about 20% under the boiling water test.

While the invention has been described in connection with improved cartridge casings, certain of the advantages of the invention may be obtained in applications to pipe or other tubular members and structures requiring high strength at high temperatures and great dimensional stability under varying temperature conditions. For pipes required to withstand high pressures and temperatures but subjected to smaller forces in a longitudinal direction than are cartridge casings, the circumferential deformation or working should be greater and the longitudinal working less. Thus for certain purposes it may be desirable to increase the average diameter of the tubing to more than 200% and it may not be necessary to increase the length of the original tubing more than say, 25%. For whatever purpose the tubing may be used, it should be understood that the ultimate wall thickness of the final tubing, the character of the material of which it is formed, and the working and heat-setting treatments to which it is subjected are such that the tubing will retain its form and will resist deformation under squeezing forces of reasonable magnitude. Moreover, when the squeezing forces are greater than those to which the tubing will be normall subjected, it may become temporarily distorted but it will return to its normal contour upon release of such forces. The wall thickness of the final tubing greatly exceeds the thickness of material placed in the category of a flexible film, particularly when the diameter of the tubing is such in relation to wall thickness as to give the tubing the rigidity mentioned. However, the application of a substantial force serves to provide a permanent distortion of the character desired for a cartridge casing closure. Other variations than those specifically suggested may be made in the character of the polymer employed and the treatment to which the initial extruded tubing is subjected within the scope of the appended claims.

In the claims the various characteristics of the polymer employed, such as its annealed density, crystallinity, weight average molecular weight, crystalline melting point, melt index and the like, are referred to on the basis of the methods of determining those characteristics described above. The term "preferential orientations," as used in the claims with respect to molecular structure, is intended to have its well recognized meaning of substantially greater alinement in the particular directions specified than is present in a randomly oriented plastic body.

We claim:

1. A hollow tubular casing member of sufficiently high strength and form retaining characteristics for use in a shotgun cartridge, said member being made in a seamless, single layered form from a composition of matter comprising a tough, solid, essentially crystalline synthetic substantially linear polymer which has an annealed density of at least 0.94 and at least 90% of which is formed from ethylene, said polymer having preferential orientations of its molecular structure both longitudinally and circumferentially of the tube, and said member being dimensionally stable at temperatures up to 150° F.

2. An improved tubular member of sufficiently high tensile strength and form retaining properties for use as a casing in a shotgun cartridge, said member being made in a seamless, single layered form of a composition of matter comprising a synthetic substantially linear polymer of ethylene which is at least 60% crystalline and has a molecular structure in which the molecules have preferential orientations parallel to and circumferentially of the longitudinal axis of the member, and said member having the stresses caused by the orienting forces so modified as to render said member dimensionally stable at temperatures up to 150° F.

3. An improved tubular member of sufficiently high tensile strength and form retaining properties as well as resistance to shrinkage for use as a casing in a shotgun cartridge, said member being made in a seamless, single layered form of a polymeric material comprising a synthetic substantially linear polymer of ethylene, the molecules of the polymeric material of said casing member having preferential orientations both longitudinally and circumferentially of said member with the preferential orientation of the linear molecules greater in a direction parallel to the longitudinal axis of said member than circumferentially thereof, the stresses incident to such orientation being offset to render said member dimensionally stable at temperatures up to 150° F.

4. A tubular cartridge casing formed as a seamless, single layered member of a material comprising a tough dimensionally stable, solid, synthetic, substantially linear polymer of ethylene which is of crystalline structure to the extent of at least 60%, has a high weight average molecular weight bearing a predetermined relation to its melt index, has a melt index of less than 1.0, an annealed density of about 0.955, and has its molecules highly preferentially oriented in the direction of the length of the casing, said molecules being so oriented to such an extent that the member will shrink in length to the extent of 70% upon heating to a temperature above its crystalline melting point, said member being resistant to shrinkage at temperatures up to 150° F.

5. A shotshell body comprising a form retaining tubular portion formed as a seamless, single layered member of a material comprising a solid, synthetic, substantially linear polymer of ethylene which is crystalline to the extent of at least 80%, has an annealed density of at least 0.94, a weight average molecular weight of at least 125,000, a melt index of about 0.4, is dimensionally stable at temperatures up to 150° F. and has its molecular structure provided with preferential orientations parallel to and circumferentially of the longitudinal axis of the tubular portion to such an extent that the latter will shrink upon heating to a temperature above its crystalline melting point to the extent of at least 70% in a lengthwise direction and at least 20% in a circumferential direction.

6. A firearm cartridge having a seamless, single layered, completely integrated casing comprising a form retaining tubular portion consisting of a solid substantially linear polymer of an olefinic composition formed to the extent of at least 90% of polymerized ethylene having a weight average molecular weight of at least 125,000 and being crystalline in structure to the extent of at least 60%, said polymer having preferential orientations of its molecular structure in both the longitudinal and circumferential directions of the tubular portion and having the stresses incident to orientation of the molecules offset so as to render the casing dimensionally stable.

7. A firearm cartridge comprising a seamless, single layered, completely integrated tubular casing made of a composition of matter comprising a solid substantially linear polymer of ethylene having a melt index of less than about 0.7 and an annealed density of between 0.94 and 0.97, said polymer having preferential orientations of its molecular structure in both the longitudinal and circumferential directions of the casing, said casing when suspended in glycerin and heated to a temperature of 280° F. showing an $R_L$ of between 2.5 and 6.0 and an $R_C$ of between 1.2 and 1.4.

8. A tubular casing member for a cartridge comprising a seamless, single layered tube formed of a solid synthetic substantially linear polymer of ethylene which is crystalline to the extent indicated by an annealed density of between 0.94 and 0.97 and has a melt index of less than 0.7, the molecules of said polymer having been preferentially oriented to a substantial extent in a direction longitudinally of said cartridge casing and in a direction circumferentially thereof, said casing member being dimensionally stable, the preferential orientations of the molecules of the polymer being such that upon suspending said member in glycerin and heating the same to 280° F. until said member ceases to contract further the ratio of the cross-sectional area of its wall after such contraction to the previously existing cross-sectional area of the wall of the member bears such a relationship to the ratio of the previously existing average diameter of the member to the average diameter after such contraction that the first-mentioned ratio is at least twice as great and not more than five times as great as the second-mentioned ratio.

9. A tubular firearm cartridge casing member made in a seamless, single layered form of a composition of matter comprising a solid substantially linear polymer of at least one olefin and consisting of polymerized ethylene to the extent of at least 90%, the ethylene portion of said polymer being crystalline to the extent of at least 60%, the polymer having an annealed density of at least 0.94 and having a melt index of not more than 1.0, the molecules of said polymer having preferential orientations in directions circumferentially of the lengthwise axis of said casing member and parallel with said axis, said casing member being dimensionally stable at temperatures up to 150° F., said orientations being such that the casing member when suspended in glycerin and heated to a temperature of 280° F. until no further contraction takes place will have its circumference contracted to the extent of from 15% to 30% and the cross-sectional area of its wall increased to the extent of from 150% to 500%.

10. A form retaining tubular member adapted to resist high rupturing forces in both a longitudinal and a circumferential direction at high temperatures which comprises a seamless, single layered tube formed of a substantially linear, olefinic polymer composed to the extent of at least 90% of ethylene groups, said polymer having an annealed density of at least 0.94, a weight average molecular weight of more than 125,000, a crystallinity of more than 60%, a melt index less than 1.0, and a crystalline melting point of at least 125° C., said member having the molecules of said polymeric material preferentially oriented in both a longitudinal and a circumferential direction relative to the lengthwise axis of said member.

11. A tubular member of the character set forth in claim 10 in which the weight average molecular weight (Mw.) of said polymer in relation to its melt index (MI) falls between two straight lines plotted on a double logarithmic chart, one line showing an Mw. of 425,000 for an MI of .01 and an Mw. of 125,000 for an MI of 1.0, and the other of said lines showing an Mw. of 650,000 for an MI of .01 and an Mw. of 190,000 for an MI of 1.0.

12. A tubular member of the character defined by claim 10 being so preferentially oriented that the tubular member, when suspended in a bath of glycerin and subjected to a temperature slightly above the melting point of the material of which the member is formed will shrink to the extent of at least 15% in its mean diameter and increase in the cross-sectional area of its wall to the extent of at least 25%.

13. A tubular member of the character defined by claim 11 being so preferentially oriented that the tubular member, when suspended in glycerin and subjected to a temperature slightly above the melting point of the material of which the member is formed will contract at least 25% in its mean diameter and will increase in the cross-sectional area of its wall to an extent of at least 300% of the initial cross-sectional area.

14. A highly heat and pressure resistant seamless tubular casing formed of a tough, strong, solid olefinic polymer which is composed of one or more olefins and consists of polymerized ethylene to the extent of at least 90% by weight, the molecular structure of said polymer having preferential orientations both along and circumferentially of the lengthwise direction of said tubular casing, and said tubular casing having the orienting stresses offset to render the casing dimensionally stable at temperatures up to 150° F.

15. A single layered form retaining tubular member adapted to resist high rupturing forces in both a longitudinal and a circumferential direction at high temperatures which comprises a seamless tube formed of a composition of matter comprising a solid polymer of one or more olefins and consisting of polymerized ethylene to the extent of at least 90% by weight, the polymer having an annealed density of at least 0.94, a weight average molecular weight of at least 125,000, a melt index of less than 1.0, and a crystalline melting point of at least 125° C., the molecules of said polymeric material forming said member having preferential orientations in both a longitudinal and a circumferential direction relative to the lengthwise axis of the tubular member and having the orienting stresses offset to render said member dimensionally stable at temperatures up to 150° F.

References Cited in the file of this patent

UNITED STATES PATENTS

| | | |
|---|---|---|
| 2,083,665 | Pihl et al. | June 15, 1937 |
| 2,137,350 | Roberts | Nov. 22, 1938 |
| 2,244,208 | Miles | June 3, 1941 |
| 2,249,510 | Welker | July 15, 1941 |
| 2,307,817 | Austin | Jan. 12, 1943 |
| 2,325,060 | Ingersoll | July 27, 1943 |
| 2,784,457 | Dunmire | Mar. 12, 1957 |
| 2,824,090 | Edwards et al. | Feb. 18, 1958 |
| 2,825,721 | Hogan et al. | Mar. 4, 1958 |
| 2,867,848 | McGlamery | Jan. 13, 1959 |
| 2,916,764 | Gerber | Dec. 15, 1959 |
| 2,926,065 | Coplan et al. | Feb. 23, 1960 |
| 2,952,867 | Diedrich et al. | Sept. 20, 1960 |
| 2,961,711 | Diedrich et al. | Nov. 29, 1960 |
| 2,979,777 | Goldman | Apr. 18, 1961 |

FOREIGN PATENTS

| | | |
|---|---|---|
| 510,145 | Canada | Feb. 15, 1955 |
| 732,633 | Great Britain | June 29, 1955 |
| 741,962 | Great Britain | Dec. 14, 1955 |
| 765,904 | Great Britain | Jan. 16, 1957 |

UNITED STATES PATENT OFFICE
CERTIFICATE OF CORRECTION

Patent No. 3,103,170 September 10, 1963

Robert A. Covington, Jr., et al.

It is hereby certified that error appears in the above numbered patent requiring correction and that the said Letters Patent should read as corrected below.

Column 6, line 25, for "temptrature" read -- temperature --; column 13, lines 49 and 50, for "swinging" read -- swaging --; column 14, line 34, for "normall" read -- normally --.

Signed and sealed this 28th day of April 1964.

(SEAL)
Attest:
ERNEST W. SWIDER

Attesting Officer

EDWARD J. BRENNER
Commissioner of Patents